US007857200B1

(12) United States Patent
Rouverol

(10) Patent No.: US 7,857,200 B1
(45) Date of Patent: Dec. 28, 2010

(54) SAVE DEMOCRACY ELECTION SYSTEM

(76) Inventor: William Rouverol, 1320 Addison St., Berkeley, CA (US) 94702

( * ) Notice: Subject to any disclaimer, the term of this patent is extended or adjusted under 35 U.S.C. 154(b) by 600 days.

(21) Appl. No.: 11/973,463

(22) Filed: Oct. 9, 2007

Related U.S. Application Data

(60) Provisional application No. 60/927,064, filed on Apr. 30, 2007.

(51) Int. Cl.
*G07C 13/00* (2006.01)
*G06K 17/00* (2006.01)

(52) U.S. Cl. ........................................ 235/51; 235/386

(58) Field of Classification Search .................. 235/51, 235/50 B, 375, 54 C, 54 A, 50 A, 54 F, 55 E, 235/56, 386
See application file for complete search history.

(56) References Cited

U.S. PATENT DOCUMENTS 3,772,793 A * 11/1973 Anderson et al. ............. 33/527
3,787,662 A * 1/1974 Martin et al. .............. 235/54 F
3,790,073 A * 2/1974 Martin et al. .............. 235/54 F
5,189,288 A * 2/1993 Anno et al. ................. 235/386
6,726,090 B1 * 4/2004 Kargel ......................... 235/51
6,991,161 B2 * 1/2006 Pazniokas et al. ........... 235/386
7,043,451 B2 * 5/2006 Strayer et al. ................. 705/39
7,048,186 B1 * 5/2006 Chandler et al. ............ 235/386
7,055,742 B2 * 6/2006 Sinha ......................... 235/386
7,077,314 B2 * 7/2006 Johnson ...................... 235/386

* cited by examiner

*Primary Examiner*—Thien M Le
(74) *Attorney, Agent, or Firm*—Howard Cohen

(57) ABSTRACT

An election system that is immune to rigging, costs only 5 to 20 percent of that of prior art e-voting systems, and entirely eliminates wasted voter time spent standing in line. The method used in the new system is to print each separate office or proposition on a separate playing-card size card adapted to be inserted in a separate ballot box while by means of an odometer the official reception of the voter's vote is shown to the voter by the odometer display.

10 Claims, 3 Drawing Sheets

SAVE DEMOCRACY ELECTION SYSTEM

CROSS-REFERENCE TO RELATED APPLICATIONS

This application claims filing date priority based on U.S. Provisional Application 60/927,064, filed Apr. 30, 2007.

FEDERALLY FUNDED RESEARCH

Not applicable.

SEQUENCE LISTING, ETC. ON CD

Not applicable.

BACKGROUND OF THE INVENTION

1. Field of the Invention

This invention generally relates to methods for reducing the vulnerability of election procedures to rigging and hacking. Specifically, it relates to election procedures that avoid the use of electronic voting and vote tabulation that have both been shown to be extremely easy to manipulate because they are driven by computer programs that can readily be altered by putting "patches" onto the computer source code.

2. Description of Related Art

Applicant knows of no prior art that teaches the method of dividing the full-page ballot into a large number of small cards, each of which lists, the candidates for a single office or a single initiative proposition, while the voting booth contains a separate ballot box for each single office or proposition. In addition, each separate ballot box has at least three compartments, with labels reading "Rep", "Dem", and "Other" or "Prop. A—Yes", "Prop. A—No" and "Cards with no vote".

BRIEF SUMMARY OF THE INVENTION

The present invention has four goals. The main goal is to eliminate election rigging and hacking. The three secondary goals are also highly desirable. They include: (1) Enhanced Security; (2) Reduced cost; and (3) Increased speed, so that voters will not have to wait in line to vote. The extent to which these four goals have been met will be evident when the preferred embodiments have been fully described.

In one aspect the invention includes a method for conducting elections in which voters cast ballots for candidates for office, propositions, and other questions that are typically put to the citizens in federal, state, and local elections. The method includes the steps of creating and printing ballots comprised of a plurality of cards, each card displaying the candidates for a single office, or a single proposition, or the like. Thus each voter who votes at a polling place is given a deck of ballot cards on which the voter marks the selected candidate(s), and enters Yes/No/Abstain choices (or the like) for propositions and other issues on the ballot. The method includes the step of providing a ballot box at the polling place that is comprised of a plurality of closed boxes, each labeled to correspond to one of the ballot card categories, and each including a slot to accept a ballot card therein.

A salient feature of the invention is the provision of a mechanism and method step for tabulating (logging the insertion of a ballot card in a ballot box) each ballot card, and maintaining a running count of the ballots inserted in each of the plurality of ballot boxes in each polling booth. Thus the invention generates an accurate count of the number of votes cast in each polling place, and the tabulated number must equal the actual number of ballot cards; otherwise, there is prima fade evidence that there has been tampering with the ballots or the tabulation count. Moreover, the counter that logs the casting of each ballot card into its ballot box is arranged to be visualize by the voter, at least to the extent of seeing the least significant digit of the counter incremented as the ballot card is inserted, so that the voter may see and confirm that each ballot card has been counted and tabulated.

DETAILED DESCRIPTION OF THE INVENTION

Figure 6:
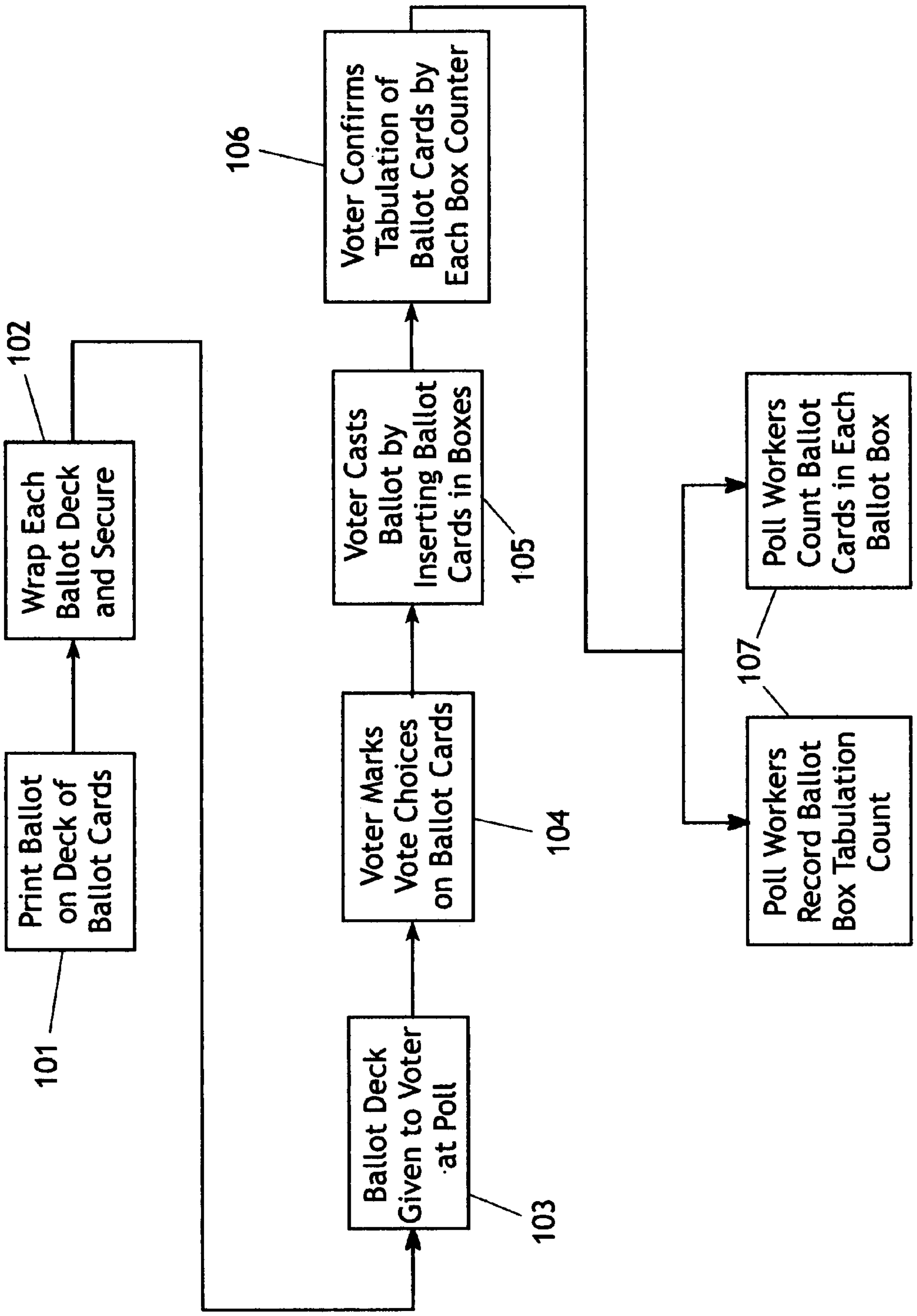
FIG. 6 is a flow chart that depicts the steps of the voting method of the invention.

Because the invention herein disclosed is primarily a method of reducing or eliminating fraud in elections, it is best described with reference to the flow diagram of FIG. 6, with seven steps depicted in a series. The working of the invention can then be described in a verbal disclosure of the seven steps, in the correct sequence, of what happens to a typical ballot.

The first step 101 is the printing of the ballot, which consists of a deck of small cards about the size of an ordinary playing card. Each card is typically two and a half inches by three and a half inches, and about ten thousandths of an inch thick. Each card lists the names of all the candidates for one (and only one) particular office (president, governor, senator, congressman, etc., or one particular initiative proposition. The entire ballot might consist of 20 or 30 cards or sometimes even more. All the cards are the same size.)

The second step 102 is that for security, there is a paper wrapping that identifies the state, county and precinct of the election. Several hundred of these ballot decks are distributed to the check-in attendant of each precinct (as well as several hundred to the County Clerk for use in behalf of absentee voters).

The third step 103 is to provide the voter with a ballot deck. When he/she enters the precinct, the voter's name is crossed off the registration list by the check-in attendant, who hands the deck to the voter.

The fourth step 104 is taken when the voter takes his/her deck to a vacant position at one of the "work place" card tables set up in the polling place. Each table has four chairs and on the table top an X-shaped screen about three feet high which gives each voter temporary privacy while he/she marks (or punches, as the case may be) his/her ballot cards. The cards are arranged in numerical order.

The fifth step 105 is taken when the voter takes his/her marked (or punched) cards to a curtained voting booth. The voting booth has 20 to 30 small ballot boxes, each about six inches deep, 3.0 inches (76.2 mm) wide, and about 15 inches in height. The number of these ballot boxes is exactly the same as the number of ballots cards each voter has been given, and each ballot box has a primary label that matches the office (or initiative proposition) on one of the voter's ballot cards and an additional label "Rep", "Dem", or "Other", or "Prop. A—Yes" (or B, C, etc.), "Prop. A—No" (or B, C, etc.), or "Cards with no vote". As each ballot box is divided into three compartments, one above the other, each with a slot slightly wider than the ballot card, the voter must insert each of his/her 20 to 30 cards into one of the three same-labeled slots. The ballot boxes are arranged in numerical order left to right. (Ideally, the voter should not occupy the voting booths for longer that one to two minutes. If necessary, the procedure may be accelerated and kept free of error by printing large matching background numbers on ballot boxes and ballot cards.)

The sixth step 106 coincides with the fifth step, because it is a confirmation step. Each of the three compartments in the ballot box has an odometer that is geared directly to the ballot card, so that as it is inserted, it changes the final digit of the odometer, e.g., 0 goes to 1, 1 goes to 2, etc. As the odometer display is adjacent to the card slot, the voter can see every one of his votes added to the official vote total as he pushes in each card. If this does not restore confidence in the presently disgraced U.S. election system, nothing will.

As the seventh and final step 107 in the working of the herein disclosed invention, which is taken at the moment the polls close, a bipartisan poll team unlocks the small screens that conceal all of each odometer display except the final digit, so that the official precinct total can be read, recorded, and witnessed by all party representatives on duty at closing time. As a precinct may have 60 to 90 odometer totals to read and record, it may take an hour or so to complete the witnessing operation and to remove the cumulative card stacks for checking to find and tabulate any card insertion errors by the method described below, and making appropriate corrections in the odometer display totals.

In addition to the methods portion of my invention, there is one portion that comprises a small apparatus. This is the mechanism that connects the ballot card to the odometer, which ensures that the lengthwise translation of the card by exactly one full card length will produce exactly one full 360 degree rotation of the odometer input shaft. In mechanical engineering, the basic device used to accomplish this interaction is called a "rack and pinion" system, but in the invention herein disclosed the system has several unique features:

1. The "rack" member is simply a card about 0.010 inches (0.254 mm) thick, with holes instead of protruding teeth.
2. The "pinion" member has teeth, but they are unlike conventional involute teeth. They are tapered circular-section pins with involute profiles, having pointed tips.
3. Instead of a standard 14.5 or 20 degree pressure angle, the pressure angle is zero.
4. The teeth are much finer than conventional gear teeth, by about twice.
5. The contact area between mating teeth is a small concave-convex zone.

Figure 1:
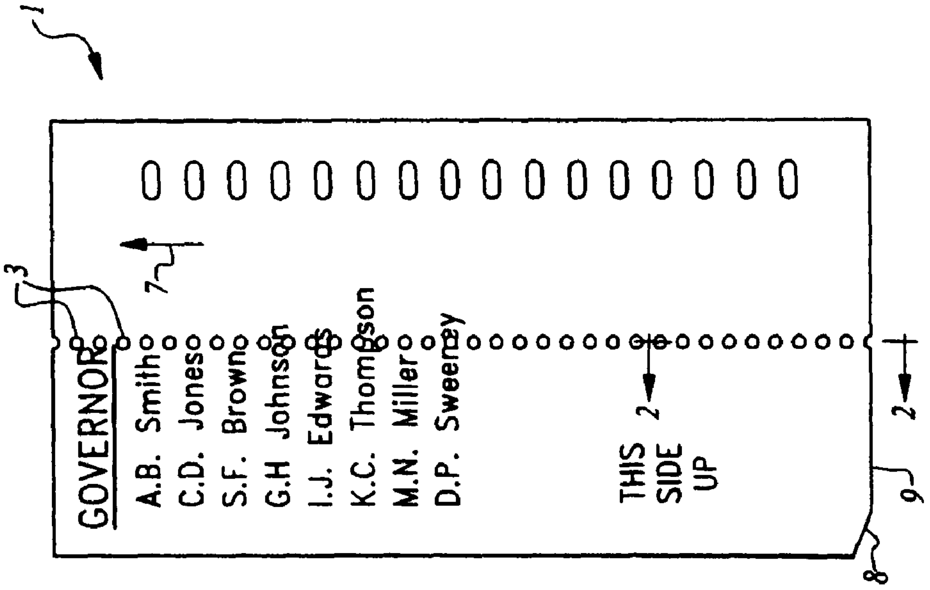
FIG. 1 is a plan view of a typical ballot card formed in accordance with the present invention.

FIG. 1 is a plan view of a typical ballot card, showing the row of holes that allow the card to engage the pinion gear and cause it to rotate as the card is inserted into the ballot box compartment.

Figure 2:
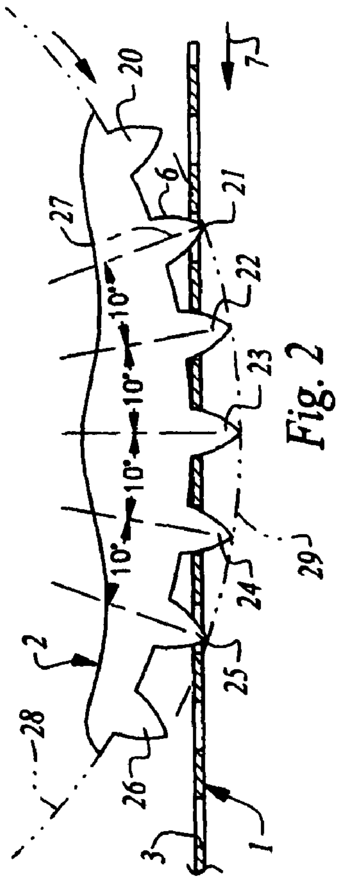
FIG. 2 is a cut elevation showing the ballot card engaging the pinion of the ballot tabulating mechanism of the invention.

FIG. 2 is a cut elevation showing the card engaging the pinion, and causing it to rotate in proportion to the lengthwise movement of the card, while the involute arc profile of its teeth causes the line of action of the meshing process to keep the pressure line tangent to the pitch circle of the pinion teeth. In order for one full length movement of the card to produce exactly 360 degrees of rotation of the odometer drive shaft, it is usually convenient to have the number of holes in the card equal to the number of teeth on the pinion. The only exception to this is when the pinion is separated from the odometer drive shaft by at least one idler.

Figure 3:
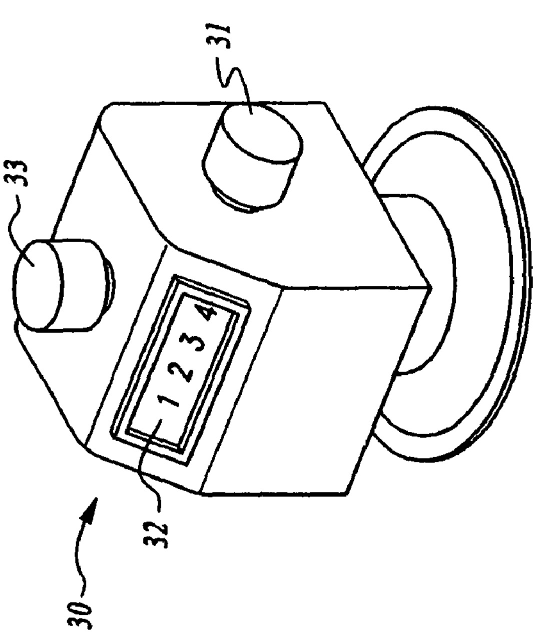
Fig. 3 (Prior Art)
FIG. 3 is a perspective view of a typical prior art odometer and display that may be employed in the present invention.

FIG. 3 shows what is generally called a "counter" but in this specification is called an "odometer" 30, to avoid confusion with the elongated shelf where payment for retail purchases or check-out is transacted. The term "odometer" is also familiar to automobile owners or passengers because it meters mileage driven. A true odometer tabulates only mileage, but the internal construction is the same as the mechanical counter of FIG. 3 which is simply a display of several digits reflecting a series of ten-to-one gear pairs each of which controls one digit of a total number. In our case, for a single precinct, the maximum display needed is 999. The device of FIG. 3 is of course prior art, as a new use of an old device. Features in FIG. 3 are the drive shaft 31, the odometer 30, display digits 32, and the reset button 33.

Figure 4:
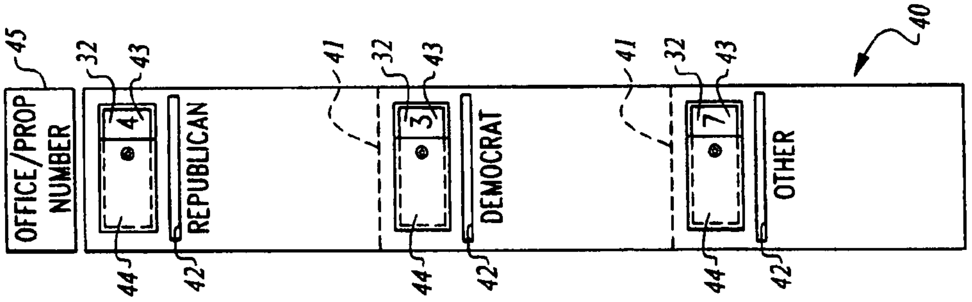
FIG. 4 shows a front elevation of a typical ballot box embodying the invention.

FIG. 4 shows a front elevation of a typical ballot box 40 embodying the invention. It has three compartments, each having an odometer 30 that counts and displays the number of ballot cards 1 inserted through its slot 42. In practice, only the rightmost digit 43 is visible to the voter.

Figure 5:
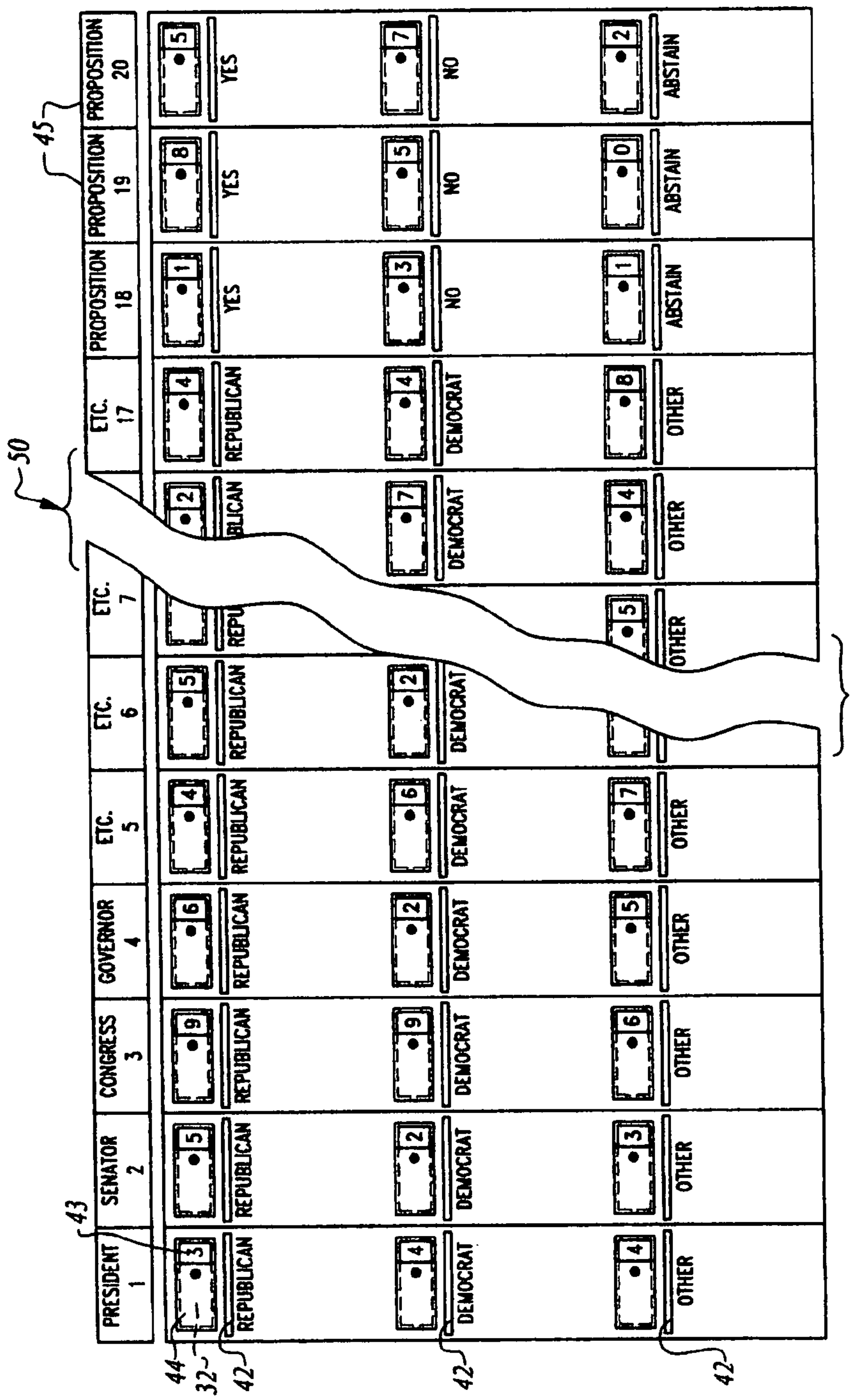
FIG. 5 shows a front elevation of a set of 20 ballot boxes such as shown in FIG. 4 assembled together for placement in a voting booth.

FIG. 5 shows a front elevation of a set of 20 ballot boxes 40 such as shown in FIG. 4 assembled together for placement in the curtained booth (not shown). Since each has three slots 42, the voter is presented, in this design, with 60 slots 42 adapted to receive his/her 20 ballot cards 1.

DESCRIPTION OF THE PREFERRED EMBODIMENTS

In detail and referring to the drawings, FIGS. 1 and 2 describe and compare to a conventional involute rack-and-pinion gear set a special gear form wherein a flat card 1 is contained at the top, bottom and sides so it can move only in a lengthwise direction to rotate a pin wheel 2 rotatably connected to an odometer 30 without buckling or binding and sized so that one card length of transverse movement of the card produces 360 degrees of the odometer drive shaft rotation.

As stated above, FIG. 1 is a plan view of a typical ballot card 1. It lists the candidates for a single issue such as "Governor" or a single initiative proposition. The design length is 3.600 inches (91.44 mm) and the chosen number of teeth 20-24 on the pinion 2 ("pin wheel") is 36. The design pitch, if there is no idler is 3.6/36=0.100 inches (2.54 mm). This is the distance between the centers of adjacent holes 3 and also the arc distance between adjacent teeth 21, 22 (e.g.) measured on the pitch circle 28 of the pinion 2 between corresponding points on the active tooth profile 6.

As will be seen on FIG. 1, the particular office to which this ballot card applies is Governor, which is shown in large type, as is the lengthwise arrow 7 showing which end of the card 1 is to enter the slot 42 on the ballot box 40 first. Because the line of holes 3 in FIG. 1 is centered, it allows insertion of the card 1 either upside down or backwards or both. Wrongly oriented cards will be processed by the odometer as a correct vote for the intended party, but while a corner 8 removal will disclose a card 1 orientation error, the preferred error-control system is to cut a small "V" notch on one edge of each ballot card 1 at a slightly different distance from a card corner, depending on the card index number (e.g., 0 to 20 or 30). At the end of the election day, when the cards 1 are removed from the ballot boxes 40 and stacked, all the V's of each ballot box collection will be aligned except those few that are on ballot cards that have either an orientation error or a wrong-slot error. When these erroneously inserted cards are pulled and placed properly, the appropriate corrections in both the affected odometer totals can be made.

It may be seen from FIG. 2 (much enlarged, 10×), card 1 rides under tooth 20 and makes initial contact with pinion 2 on the active profile 6 of tooth 21, at a point that is close to the trailing edge 9 of the leading card 1 of the preceding voter. This confirms that FIG. 2 shows two cards 1. One is at the right and butts against the leading card 1 on the centerline of tooth 21 at 27. The leading card 1 is in contact with four pinion teeth 22, 23, 24, 25, but then rides under tooth 26 so there is not interference in the mesh. Both cards 1 are constrained top and bottom by flat plates (not shown) that are separated by say 0.012 inches if the card thickness is say 0.010 inches (0.254 mm), and the leading card 1 is closely supported for the distance from tooth 21 to slightly beyond tooth 25. The voter's hand (not shown) moves the trailing card 1 through this distance, until it's trailing edge 9 passes tooth 25, clears tooth 26, and then is free to drop by gravity into storage at the lower portion of the ballot box 40 in one of the compartments illustrated in FIG. 4. This movement of the leading card 1 will rotate the drive shaft of the odometer about 30 degrees of a full 360 degree rotation, which is too small to show any portion of the next integer on the odometer display. To minimize this effect, it is recommended that the minus 20° of rotation of pinion 2 (the centerline of tooth 21) be connected to the 000 position of the odometer 30.

It should also be noted that FIG. 2 can be inverted, but there are two advantages to the orientation shown: One is that if the right half of pinion 2 is within the lead card 1 gravity drop space, interference could occur. Putting the pinion 2 above card 1 eliminates this possibility; and secondly, it keeps the odometer display above the card 1 insertion slot 42, so the voter's hand is well removed from the sight-line toward the odometer 40 display 44. Two additional features shown in FIG. 2 are the pinion 2 pitch circle 28 and tooth tip circle 29.

FIG. 3 is an illustration of a commercially available "mechanical counter" 30. This type of odometer is quite inexpensive and comes in two different actuation forms: punch button or shaft rotation. As indicated in FIG. 2, the preferred form is the latter. The range of the display 32 shown is 0000 to 9999, whereas the odometer suited for precinct vote totals need only have a 000 to 999 range. A means to return the display to 000 such as the reset button 33, is of course essential. At least as important is a means (not shown) to prevent the mechanical counter 30 from being driven backwards. This could be a conventional ratchet connected to the input gearing of the counter 30, for example.

FIG. 4 is a front elevation of a typical ballot box 40. It is about 3.0 inches (76.2 mm) wide, 6 inches (152.4 mm) deep, and about 15 inches (381 mm) high. It is divided by interior panels 41 into three equal compartments about 5 inches (127 mm) high. The three compartments each have a horizontal slot 42 slightly over 2.50 inches (63.5 mm) wide, and an odometer display 32, preferably above it. Each of the three odometer displays 32 has a small locked panel 44 adapted to conceal from the voter all the digits of the display 32 except the right-most digit 43. Each of the three compartments has an access opening (not shown) at the back of the box 40, which may be either one large panel with three locks or three smaller panels, each with a separate lock. At the top of box 40 is a label 45 identifying which office or proposition the box 40 is for (e.g., "Governor") and below each of the three slots 42 is a label identifying the highest office preference "Rep", "Dem", or "Other" (or "Yes", "No", or "Not voting" or "Abs" for "abstain") served by the slot 42. Also, to make sure that there is no space between adjacent ballot cards 1, a shallow recess (not shown) should be made on the lips of each slot 42, usually at the right end, so that the fingers of the voter can push his/her ballot card 1 all the way to point 27. The preferred form of interior panels 41 noted earlier in this paragraph is for each panel 41 to be made of two metal sheets bolted together, since this allows the assembly 40 of FIG. 4 to be comprised of three identical modules fastened one on top of the other. This minimizes manufacturing costs and also allows the FIG. 4 assembly 40 to be increased in height to include four or more modules, so as to accommodate counties where one or more minor parties have sufficient votes to qualify for specific vote casting and tabulation treatment, separate from that of the "other" vote category.

FIG. 5 is a front elevation of an assembly 50 of 20 (or often more) ballot boxes 40, arranged in order of importance, left to right, and locked together to prevent theft. Usually the curtained booth (not shown) will be wide enough to allow a single tier, but two tiers may be used if the number of ballot boxes 40 greatly exceeds 20.

As soon as the polls are closed, the small panels that conceal the second and larger odometer digits may be unlocked. Since the witnessed recordings of the odometer totals constitute the official election results, all possible efforts must be made to ensure that these totals include no rigged votes. The great advantage of the above described voting system is that it is totally cheat-proof. The sum of the three corrected odometer totals must never be allowed to exceed the number of ballot decks distributed. This is true both at the county level and the precinct level. The number of valid ballot decks is a matter of counting the lined-out registration names at the precinct check-in counter, and at the county level an addition of absentee decks distributed to party representatives at the county seat.

Many states have absentee votes that exceed the number of precinct votes; in Oregon, 100% of the votes are absentee. There is certainly no point in installing a rigging-free tabulation system that eliminates cheating at the precinct level while allowing it to occur with the absentee ballots. This is why the processing of absentee ballots must follow essentially the same steps as those followed in the precinct, with the sole exception of who slides the ballot cards 1 into the slots 42 of the ballot boxes 40. To make sure that this operation does not become a source of corruption, it must be overseen by a plurality of voter proxies of proven party loyalty.

The job of proxy voter is obviously a position of major responsibility, as well as needing extensive time and effort each time a fresh batch of absentee ballot cards 1 arrives at the county seat. Happily, most of the work of the proxy voters can be done well in advance of election day, as all of the odometers will have been bi-partisan certified and sealed against the electronic tampering that has now become routine with e-tabulation.

It should be noted that while rigging is unmistakably exposed in the first few seconds after poll closure, simply by comparing the major odometer 32 sums with the number of official ballot decks given out at the precinct registration check-in, so that the official returns can be disqualified pending an investigation, including a full analysis of which party stood to profit by the insertion of counterfeit ballot cards. The U.S. Treasure Dept. has great capability and experience in detecting counterfeited items, but most analysis takes time and precinct returns must remain in limbo until they are cleared from the charge of rigging.

In the ensuing claims, the word "issue" is intended to mean office or initiative proposition, as the case may be.

"Save Democracy" in the title of this patent application is meant to be taken literally. Computer owners who have viewed the program www.electionfraudanalyzer.net, and who have thought for themselves about the exposures of that program, may (hopefully) find the courage to fight to get democracy back.

Here are the advantages in security, low-cost, and high speed that the above-described election reform affords:

Security: This is an "all-or-nothing" characteristic. A system that can be rigged will be rigged, so it has zero security. The reason that the above-identified system is totally unique is that it cannot be rigged. No other election system has this feature, and every other election system therefore has an inherent zero security. Here is why: Before registration was introduced, it was extremely common to rig elections by "stuffing" the ballot box. Registration changed all that. The crossing out of names on the official registration lists provided a way to determine exactly how many votes were valid. If the total vote exceed that number, the excess votes were immediately identifiable as "stuffed" and the riggers quickly changed their method to switching. For every increase in one party's vote, there had to be an equal decrease in the aggregate votes for other parties. In the 2004 general election, reliable and impartial statisticians calculated that several million votes were switched, mostly from the minor parties to one or the other of the major parties. All ten of the so-called "swing states" were heavily rigged, and three of the more populous states suffered a change of plurality as a result of switched votes. All of these switched votes could not have accrued if the official returns had been based on counters that could not be made to run in reverse, and vote casting and tabulation were simultaneous. This will explain why the foregoing specification step stipulates that all of the mechanical counters 30 to be used in the above-described election system are to be constructed to prevent operation backwards. This is what gives the system its unique 100% security rating.

Cost In the herein proposed system, the voter does his/her deliberation, of perhaps 15 to 25 minutes, at a low-cost card table, then slides his 20 or so ballot cards in the matching slots in perhaps two or three minutes, in the voting booth that houses the 20 or so ballot boxes 40, and costs altogether about $4,000. In the touch screen system, the voter occupies one of the eight $6,000 booths for 15 to 25 minutes, for an overall cost of about 15 times the cost for use of the herein disclosed voting system. It is safe to say that the relative cost of the "Save Democracy" system is somewhere in the range of 5 to 10 percent of that of the touch screen system. (In the case of a comparison with the optical scanning plus tabulator, the 5 to 10 percent figure rises to 10 to 20 percent).

Speed: Counting the time the e-system voter has to waste standing in line rather than sitting at a low-cost work-table, the total time spent by a voter using the election system described herein is expected to be only about half that taken to vote in the e-voting system.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for conducting an election and preventing rigging of the election, including the steps of:

providing a ballot consisting of a plurality of cards, each card comprising a single issue card displaying a single issue or contest to be voted on, providing a plurality of ballot boxes, each adapted to receive said cards, each of said ballot boxes receiving all of one kind of single issue or contest cards, casting the ballot by inserting the plurality of cards into the respective single issue ballot boxes; and, counting each card as it is inserted in each of said ballot boxes, whereby each ballot is tabulated as it is cast by the voter;

further including the step of providing a plurality of ballot card counters, each operatively associated with one of said plurality of ballot boxes, to perform said step of counting each card as it is inserted in each of said ballot boxes;

further including providing an indicator on each of said plurality of ballot card counters to verify that each of said ballot cards is tabulated as it is inserted in a ballot box, wherein said indicator comprises a counter having a display, and the ones digit of said counter is arranged to be viewed by a voter as each card is inserted in each of said ballot boxes;

wherein said counter is free of any electric or electronic actuation, and shall be construed as providing the official election returns;

wherein said counter is connected to be driven by a rack-and-pinion mechanism that causes the insertion movement of the ballot card to advance said counter display.

2. The method for conducting an election of claim 1, wherein each of said ballot cards includes a plurality of holes formed therein, and said rack-and-pinion mechanism is provided with a pinion gear form having pinion tooth members and spacing sufficient to be engaged and driven by said plurality of holes in one of said ballot cards.

3. The method for conducting an election of claim 2, wherein said holes consists of a series of equally spaced holes in a line parallel to one edge of said card and having the spacing of adjacent holes equal to the circular pitch of the teeth of said pinion gear which engages said holes and causes the insertion of said card to rotate the input shaft of said counter.

4. The method for conducting an election of claim 2, wherein the length of said card is substantially equal to the pitch circumference of said pinion gear.

5. The method for conducting an election of claim 1, further including providing a mechanism to prevent said rack-and-pinion mechanism from turning in reverse rotation to said insertion direction.

6. A method for conducting an election and preventing rigging of the election, including the steps of:

providing a ballot consisting of a plurality of cards, each card comprising a single issue card displaying a single issue or contest to be voted on, providing a plurality of ballot boxes, each adapted to receive said cards, each of said ballot boxes receiving all of one kind of single issue or contest cards, casting the ballot by inserting the plurality of cards into the respective single issue ballot boxes; and, counting each card as it is inserted in each of said ballot boxes, whereby each ballot is tabulated as it is cast by the voter;

further including the step of providing a plurality of ballot card counters, each operatively associated with one of said plurality of ballot boxes, to perform said step of counting each card as it is inserted in each of said ballot boxes;

further including providing an indicator on each of said plurality of ballot card counters to verify that each of said ballot cards is tabulated as it is inserted in a ballot box, wherein said indicator comprises a counter having a display, and the ones digit of said counter is arranged to he viewed by a voter as each card is inserted in each of said ballot boxes;

wherein said counter is certified to display an exact count of inserted cards, and wherein said counter is sealed to prevent any modification of card counter gear ratios after certification.

7. A method for conducting an election and preventing rigging of the election, including the steps of:

providing a ballot consisting of a plurality of cards, each card comprising a single issue card displaying a single issue or contest to be voted on, providing a plurality of ballot boxes, each adapted to receive said cards, each of said ballot boxes receiving all of one kind of single issue or contest cards, casting the ballot by inserting the plurality of cards into the respective single issue ballot boxes; and, counting each card as it is inserted in each of said ballot boxes, whereby each ballot is tabulated as it is cast by the voter;

further including the step, when the election has ended, of recording the tabulated number of ballots inserted in each of said ballot boxes, counting the number of actual ballot cards inserted in each ballot box, comparing the tabulated number to the counted number, and asserting election tampering if the sum of the card counter displays of a top issue ballot box exceeds the number of ballot card decks issued during the full election day.

8. The method for conducting an election of claim 7, further including the step of providing a plurality of ballot card counters, each operatively associated with one of said plurality of ballot boxes, to perform said step of counting each card as it is inserted in each of said ballot boxes.

9. The method for conducting an election of claim 8, further including providing an indicator on each of said plurality of ballot card counters to verify that each of said ballot cards is tabulated as it is inserted in a ballot box.

10. A method for conducting an election and preventing rigging of the election, including the steps of:

providing a ballot consisting of a plurality of cards, each card comprising a single issue card displaying a single issue or contest to be voted on, providing a plurality of ballot boxes, each adapted to receive said cards, each of said ballot boxes receiving all of one kind of single issue or contest cards, casting the ballot by inserting the plurality of cards into the respective single issue ballot boxes; and, counting each card as it is inserted in each of said ballot boxes, whereby each ballot is tabulated as it is cast by the voter;

further including the step of tabulation of absentee ballot totals based on card counter displays at the county counting center appropriately overseen by surrogate voters of all participating parties.

* * * * *